United States Patent [19]

Iwanami

[11] Patent Number: 5,786,648
[45] Date of Patent: Jul. 28, 1998

[54] MOTOR

[75] Inventor: Takashi Iwanami, Nagano, Japan

[73] Assignee: Sankyo Seiki Mfg. Co., Ltd., Nagano-ken, Japan

[21] Appl. No.: 763,984

[22] Filed: Dec. 10, 1996

[30] Foreign Application Priority Data

Dec. 13, 1995 [JP] Japan ............ 7-346731

[51] Int. Cl.$^6$ .......... H02K 5/16; F16C 33/02
[52] U.S. Cl. .......... 310/90; 310/51; 384/279; 384/902
[58] Field of Search .......... 310/51, 90, 90.5; 384/279, 255, 902

[56] References Cited

U.S. PATENT DOCUMENTS

| | | | |
|---|---|---|---|
| 3,361,914 | 1/1968 | Janssen | 310/51 |
| 4,783,608 | 11/1988 | Gruber et al. | 310/90 |
| 4,851,731 | 7/1989 | Saotome et al. | 310/258 |
| 5,036,235 | 7/1991 | Kleckner | 310/90.5 |

FOREIGN PATENT DOCUMENTS 2-164257   6/1990   Japan.

Primary Examiner—Steven A. Stephan
Assistant Examiner—Timothy A. Williams
Attorney, Agent, or Firm—McAulay Fisher Nissen Goldberg & Kiel, LLP

[57] ABSTRACT

A motor comprises a rotary shaft, an oil impregnated sintered bearing rotatably supporting the rotary shaft, a bearing holder supporting the oil impregnated sintered bearing and a motor case. A lateral pressure device is provided to the rotary shaft which abrasively contacts the rotary shaft from a radial direction and provides a lateral pressure so that the rotary shaft is displaced in the radial direction. The lateral pressure device further comprises an inner ring made of an oil impregnated sintered member in which a through-hole abrasively contacts the rotary shaft from the radial direction is formed, an elastic member which provides a lateral pressure so that the rotary shaft is displaced in the radial direction and an outer ring which holds the elastic member and is fixed to the motor case.

7 Claims, 3 Drawing Sheets

← : THE DIRECTION OF A LATERAL PRESSURE

MOTOR

BACKGROUND OF THE INVENTION a) Field of the Invention

This invention relates to a motor in which a rotary shaft of the motor is rotatably supported by an oil impregnated sintered bearing, and specifically relates to a configuration with which the rotary shaft of the motor is displaced in the radial direction.

b) Description of the Related Art

As a radial bearing supporting a rotary shaft of a motor, a low-cost oil impregnated sintered bearing has been widely used in place of a ball bearing.

The above mentioned oil impregnated sintered bearing has a large bearing loss compared to a ball bearing, and the power consumption of a motor is thereby increased. Also, due to manufacturing limitations, the oil impregnated sintered bearing is manufactured with a tolerance, a space formed between the inner diameter of the oil impregnated sintered bearing and the outer diameter of the rotary shaft.

For this reason, in a motor device using an oil impregnated sintered bearing, when the load is rotated, a centrifugal force is generated. As a result, the force which the load gives the rotary shaft in the radial direction slightly varies, and there may be a chance that the rotary shaft of the motor irregularly contacts the oil impregnated sintered bearing.

For example, when the load is an impeller, the subtle difference of the fluid flow which the impeller stirs adds force in the radial direction to the rotary shaft. Consequently, not only the motor vibrates, but also the mechanical noise is generated, shortening the usable life of the motor device.

In addition, when the load is a disk driving motor such as a CD-ROM, the amount of shaft movement is large, and the amount of displacement and vibration increases compared to the use of a ball bearing; therefore, the rotary shaft of the motor easily cants with the vibration and shock. For this reason, it is highly possible to increase the ratio of errors in reading data.

For the reasons mentioned, a motor bearing structure has been proposed in which the above mentioned movement is regulated by displacing the rotary shaft by adding force, from the beginning, in a specific radial direction to the rotary shaft of the motor.

FIG. 4 is a cross section showing a conventional embodiment of such a structure used in a compact motor with brushes attached.

The motor 1 in FIG. 4 has, as a motor case, a bowl-like shield case 2 shown in outline and a stator case 3.

At the center of the stator case 3, an oil impregnated sintered bearing 13 made of a sintered oilless alloy is arranged; an oil impregnated sintered bearing 5 is arranged on a bearing case 9 on the commutator 10 side by a thrust washer 12.

The oil impregnated sintered bearings 13 and 5 support the rotary shaft 7, and a magnet 4 is provided on the inner circle surface of the stator case 3 which is formed annularly.

Ferromagnetic units 41 and 42, one of the upper and lower sides of which is strongly magnetized, are constructed on the magnet 4 as illustrated, and they are provided in the facing surfaces interposing the rotary shaft 7 therebetween so that their upper and lower sides are up side down to each other.

A core 6 around which a coil 8 is wound is arranged opposite the magnet 4 putting a space therebetween, and is fixed to the rotary shaft 7.

A commutator 10 is provided on the rotary shaft 7; the current is supplied to the coil 8 through the commutator 10.

A driving circuit 11 is provided in the motor 1; the predetermined current from the circuit 11 is supplied to the coil 8 through the commutator 10; the core 6 is magnetized and the rotary shaft 7 is rotated by the mutual action between the core 6 and the magnet 4.

At this time, as mentioned above, the magnet 4 has the ferromagnetic units 41 and 42 in the facing surfaces with the rotary shaft 7 therebetween; the units 41 and 42 are provided so that their upper and lower sides are reversed to each other. For this reason, the magnetic flux direction which one of multiple salient-poles of the core 6 receives is different from the magnetic flux direction which another salient-pole of the core 6 receives, and therefore, the core 6 receives the force in the direction shown by arrow q.

As a result, the rotary shaft 7 receives an appropriate lateral pressure with which it is displaced in a constant direction. In addition, the rotary shaft 7 rotates while receiving the force so that it contacts the oil impregnated sintered bearings 13 and 5.

When the load (not illustrated) mounted to the rotary shaft 7 rotates, even if it rotates in a direction which causes a grinding movement, the grinding movement is prevented by the predetermined lateral pressure. Therefore, an extraordinary current increase for the motor 1 or the tapping noise generated in the oil impregnated sintered bearings 13 and 5 on the motor 1 side are mostly cancelled.

In the above mentioned motor device, an effective magnetic flux of the magnet 4 becomes small compared to the size of the magnet, and therefore, the outer form of the motor 1 obtaining the same output becomes large.

Further, FIG. 5 is a cross section showing another conventional embodiment, disclosed in Japan Patent Laid-open Kokai H2-214460, in which the deviated force is given to the rotary shaft of the motor.

In FIG. 5, two ball bearings 18a and 18b are provided to a sleeve unit 16 of a holder 15; eccentric grooves 17 are formed at a place which bears the ball bearing 18b.

In the eccentric grooves 17 an elastic piece 19 is inserted which energizes the rotary shaft 7 in the radial direction; the rotary shaft 7 is displaced by the elastic piece 19 which supports the ball bearing 18b.

With this structure, when the sleeve 16 of the holder is formed with a molded product by such as die-cast, the eccentric grooves 17 can be easily formed; however, when the holder is formed by plastically working a metallic plate, the process becomes complicated, not only being difficult to process, but also resulting in an expensive final product.

OBJECT AND SUMMARY OF THE INVENTION

This invention primarily aims to provide a bearing structure of a motor comprising a space between a rotary shaft through-hole of an oil impregnated sintered bearing and the rotary shaft, and a displacement mechanism with which the rotary shaft is not displaced nor does it vibrate even when the rotary shaft is given a force by a load with which it normally would irregularly contact the above mentioned oil impregnated sintered bearing.

In accordance with the invention, a motor comprises a rotary shaft, an oil impregnated sintered bearing rotatably supporting the rotary shaft, a bearing holder supporting the oil impregnated sintered bearing and a motor case. Lateral pressure means are provided to the rotary shaft which abrasively contacts the rotary shaft from a radial direction and provides a lateral pressure so that the rotary shaft is displaced in the radial direction.

The lateral pressure means further comprises an inner ring made of an oil impregnated sintered member in which a through-hole abrasively contacts the rotary shaft from the radial direction is formed, an elastic member which provides a lateral pressure so that the rotary shaft is displaced in the radial direction and an outer ring which holds the elastic member and is fixed to the motor case.

DESCRIPTION OF THE PREFERRED EMBODIMENTS

Figure 1A:
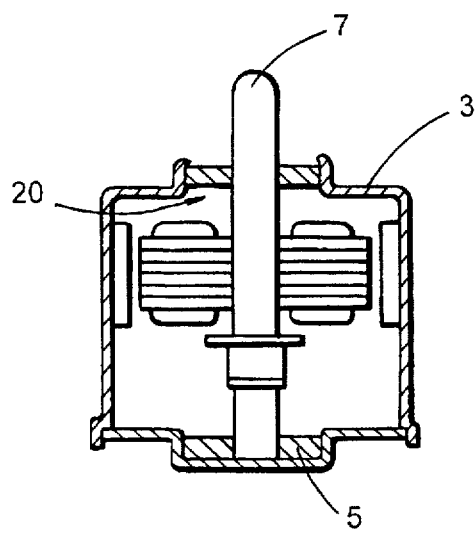
FIGS. 1(a), 1(b) 1(c) and 1(d) are cross sections of a motor showing a first embodiment of this invention.
Figure 1B:
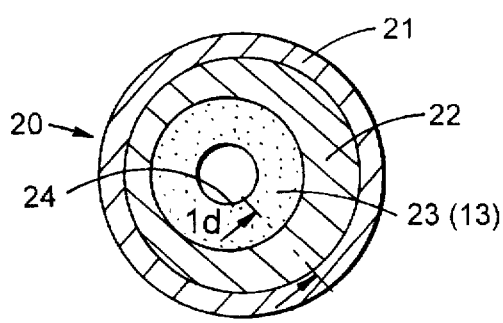
Figure 1C:
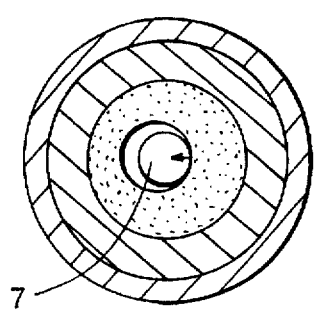
Figure 1D:
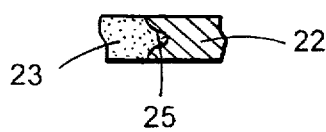
Figure 4:
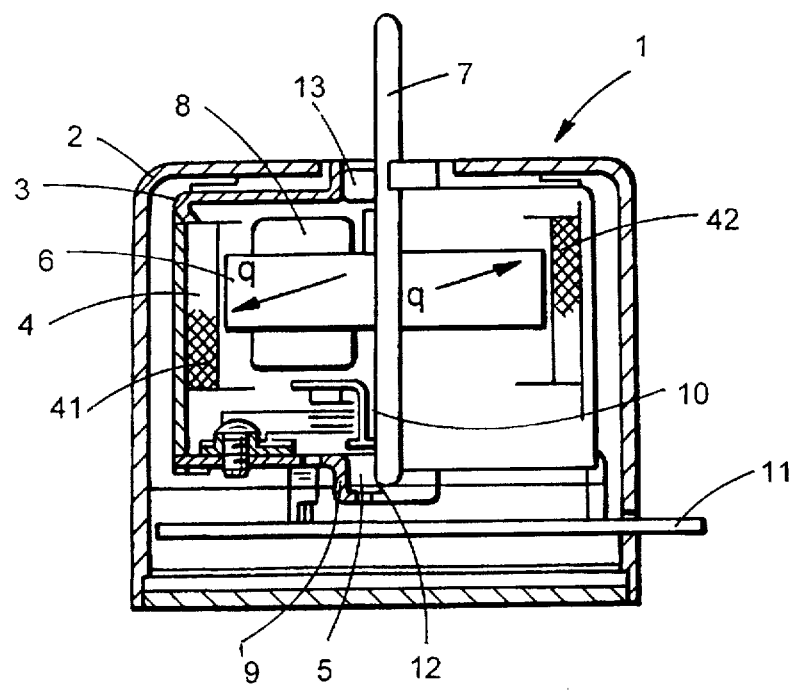
FIG. 4 is a cross section showing a conventional embodiment in which a lateral pressure mechanism is added to a compact motor with brushes attached.

FIGS. 1(a) through (c) are cross-sections showing a first embodiment of a motor of this invention, and a comparison with a conventional embodiment illustrated in FIG. 4.

The same functionality and operation as in FIG. 4 are used by the element designations hereafter and their descriptions are omitted.

In FIG. 1, a rotary shaft 7 of the motor is supported by two oil impregnated sintered bearings 13 and 5 which are engaged with a stator case 3 as a motor case.

In the first embodiment, at least one of the two oil impregnated sintered bearings 13 and 5, as illustrated in FIG. 1(b), is configured as a bearing structure in which a lateral pressure means 20 is comprised of and formed integral with an outer ring, an elastic member, and an inner ring.

The embodiment is described using a bearing structure in which the lateral pressure means 20 is formed integral with the oil impregnated sintered bearing 13 on the upper side in the figure, in order to simplify the description.

A bearing holder 21 is engaged with a holding surface of the stator case 3, and is constituted as the outer ring of the lateral pressure means 20.

Inside the bearing holder 21, an oil impregnated sintered member 23 as the inner ring is provided at a predetermined position as described below via the elastic member 22.

At the center of the oil impregnated sintered member 23 is formed a through-hole 24 having a slightly larger diameter than the outer diameter of the rotary shaft 7.

The oil impregnated sintered member 23 is arranged in the bearing holder 21 so that the center of the through-hole 24 is at an eccentric position with respect to the center of the rotary shaft 7 when the bearing 13 is engaged with the stator case 3.

For this reason, since, in the lateral pressure means 20, the center position of the inner ring (the oil impregnated sintered member) 23 and the center of the outer ring (bearing holder) 21 are displaced from each other, when the rotary shaft 7 of the motor is supported by passing through the through-hole 24 as illustrated in FIG. 1(c), the rotary shaft 7 receives a lateral pressure in the arrow direction, that is, along the line which connects the centers of the inner ring and outer ring, and it is displaced in the radial direction while contacting the oil impregnated sintered member 23.

Next, one embodiment of manufacturing the lateral pressure means 20 is described.

The bearing holder 21 is formed using, for example, a metallic pipe; the bearing holder 21 and the oil impregnated sintered member 23 in which the through hole 24 having a predetermined diameter is formed are fixed using a jig and the like.

In other words, the oil impregnated sintered member 23 is fixed inside the bearing holder 21 so that the center position of the through hole 24 is displaced from the center position of the bearing holder 21.

After fixing them, a monomer resin (the elastic member 22) is injected in a space between the bearing holder 21 and the oil impregnated sintered member 23 to produce the lateral pressure means 20.

The above mentioned monomer resin obtains expansiveness after polymerization and has a bonding capability with respect to the bearing holder 21 and the oil impregnated sintered member 23. For example, it is polymerized by heat.

To ensure bonding between the elastic member 22 and the oil impregnated sintered member 23, a step unit 25 is formed on the annular surface entirely or partially around the periphery of the oil impregnated sintered member 23 as illustrated by p-p in FIG. 1(b).

In FIG. 1(b), the step unit 25 is shaped as convex, but it may be shaped as concave; the shape is not limited to these. It can be in any shape as long as the elastic member 22 and the oil impregnated sintered member 23 are surely bonded.

Therefore, the lateral pressure means 20 described in the first embodiment can be easily installed in the stator case 3 in place of the conventionally used ball bearing or the bearing made of only the sintered oilless alloy.

Figure 5:
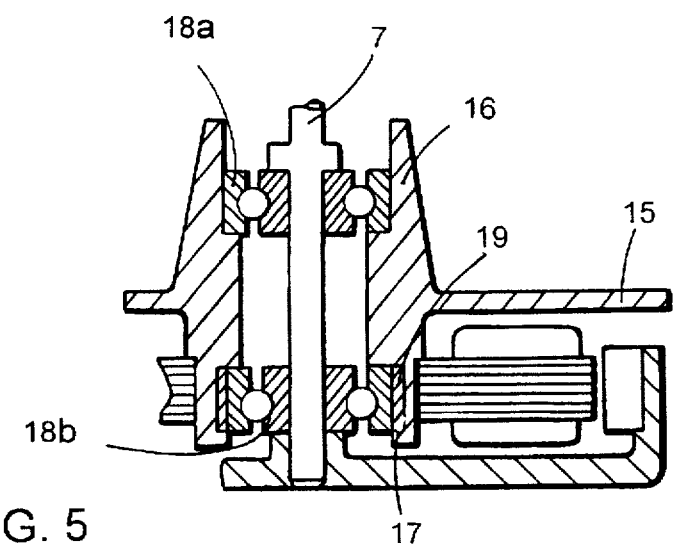
FIG. 5 is a cross section showing a conventional embodiment in which a lateral pressure mechanism is applied to a spindle motor for an information disk.

In particular, as in the conventional embodiment illustrated in FIG. 5, the holder body itself holding the ball bearing does not need to be processed. For this reason, the holder does not have to be a thick molded product such as die-cast, but even a metallic plastic work product can be easily installed.

Figure 2:
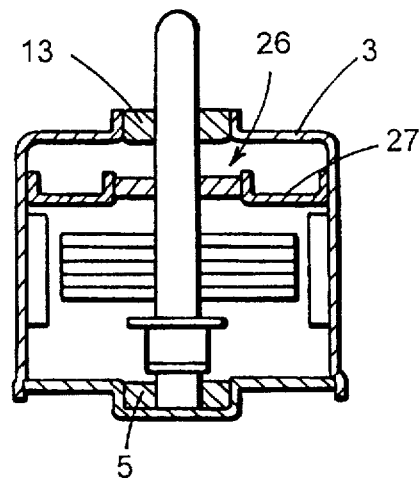
FIG. 2 is a cross section of a motor showing a second embodiment of this invention.

Next, a second embodiment of the motor of this invention is described referring to FIG. 2.

As illustrated in FIG. 2, a holder 27 is arranged at a predetermined position between the bearings 13 and 5 made of only a sintered oilless alloy as illustrated in FIG. 4; the lateral pressure means 26 is provided in the holder 27 as a third bearing having the same configuration as in the first embodiment.

For this reason, the rotary shaft 7 of the motor is displaced in a predetermined radial direction by the lateral pressure means 26 in the same manner as in the first embodiment.

Since the structure of the lateral pressure means 26 remains the same as in the first embodiment, its description is omitted.

In the first and second embodiments (FIGS. 1 and 2), the bearing structure of the invention has been described referring to the compact motor with brushes attached; however, it can be applied to one in which the load is a spindle motor for a driving disk such as a CD-ROM.

Figure 3A:
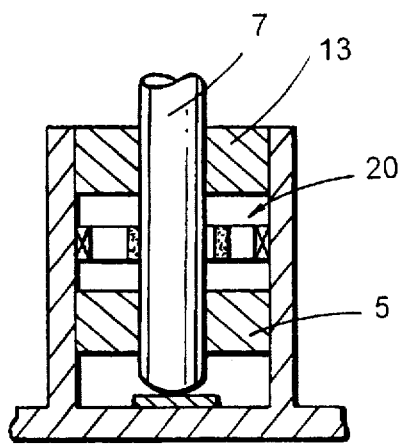
FIGS. 3(a) and 3(b) are cross sections of a motor showing a third embodiment of this invention.
Figure 3B:
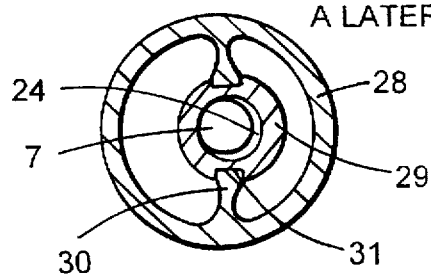

Further, FIGS. 3(a) and 3(b) show cross sections of a third embodiment of a motor in which the lateral pressure is applied to the rotary shaft 7.

In FIG. 3, the lateral pressure means 20 is comprised of a bearing holder 28 constituting the outer ring, an oil impregnated sintered member 29 constituting the inner ring, and two flexible arm-like elastic members 30 which connect the bearing holder 21 and the oil impregnated sintered member 23.

In this case, the elastic members 30 are formed of resin and the like integral with the bearing holder 28, and are engaged with the concave section 31 formed in a direction perpendicular to the peripheral surface of the oil impregnated sintered member 29.

When the oil impregnated sintered member 29 is engaged with the elastic members 30, the center position of the oil impregnated sintered member (inner ring) 29 is displaced from the center position of the bearing holder (outer ring) 28 as in the first embodiment.

At the center of the oil impregnated sintered member 29, a through-hole 24 having a slightly larger diameter than that of the rotary shaft 7 is formed.

The elastic members 30 are formed thin and almost perpendicular to the lateral pressure direction shown by the arrow so that the oil impregnated sintered member 29 is flexed when the rotary shaft 7 of the motor is inserted into the through-hole 24.

The oil impregnated sintered member 29 is engaged with the elastic members 30 so that the center of the through-hole 24 is at an eccentric position with respect to the center of the rotary shaft 7 when the lateral pressure means 20 is fixed in the shield case.

For these reasons, even in the third embodiment, when the rotary shaft 7 passes through the through-hole 24 in the oil impregnated sintered member 29, the rotary shaft 7 is given a lateral pressure in the arrow direction, that is, along the line connecting the centers of the oil impregnated sintered member 29 (inner ring) and of the bearing holder 28 (outer ring), and it contacts the oil impregnated sintered member 29 to be displaced in the radial direction, in the same manner as in the first and second embodiments.

As described above, in this invention, a lateral pressure means for giving a lateral pressure to a rotary shaft in a motor is provided to the above mentioned rotary shaft so that the rotary shaft is displaced by receiving an eccentric force in a constant direction when it contacts the rotary shaft from the radial direction.

Consequently, even when there is a space between the rotary shaft and the oil impregnated sintered bearing, giving a lateral pressure to the rotary shaft stabilizes the rotary shaft, thus ensuring precise rotation. Also, since the shaft can be prevented from shaking, vibration and mechanical noise can be prevented from occurring, thus making the device noiseless without affecting other components.

Furthermore, even when the bearing holder supporting the rotary shaft of the motor is a member other than a molded product, it can be easily installed. Moreover, the position of the rotary shaft can be displaced in a predetermined direction without increasing the volume of the motor. Since oil lubrication of the oil impregnated sintered bearing functions well, the wear of the bearing is improved, the usable life of the bearing is prolonged, and its simple configuration is economic.

While the foregoing description and drawings represent the preferred embodiments of the present invention, it will be obvious to those skilled in the art that various changes and modifications may be made therein without departing from the true spirit and scope of the present invention.

What is claimed is:

1. A motor comprising:

a rotary shaft;

first and second oil impregnated sintered bearings each rotatably supporting said rotary shaft;

first and second bearing holders supporting said first and second oil impregnated sintered bearings, respectively;

a motor case; and lateral pressure means arranged between said first and second oil impregnated sintered bearings along said rotary shaft for abrasively contacting said rotary shaft from a radial direction and providing a lateral pressure so that said rotary shaft is displaced in said radial direction;

said lateral pressure means comprising:

an inner ring made of an oil impregnated sintered member in which a through-hole abrasively contacting said rotary shaft from the radial direction is formed, an elastic member which provides a lateral pressure so that said rotary shaft is displaced in said radial direction; and an outer ring which holds said elastic member and is fixed to said motor case.

2. The motor according to claim 1, wherein said inner ring and outer ring have respective centers and wherein the center of said inner ring is displaced from the center of said outer ring.

3. The motor according to claim 2, wherein said lateral pressure given to said rotary shaft so as to displace said rotary shaft in said radial direction is added along a line which connects the centers of said inner ring and of said outer ring.

4. The motor according to claim 1, wherein said elastic member is made of a monomer resin.

5. The motor according to claim 1, wherein said oil impregnated sintered member has a step formed therein to increase its bonding capability with said elastic member.

6. The motor according to claim 1, wherein said lateral pressure means is comprised of said outer ring, said inner ring made of said oil impregnated sintered member, and a flexible arm unit which connects said outer ring and inner ring.

7. A motor according to claim 6, wherein said elastic member is formed integral with said outer ring, and is engaged with said inner ring made of said oil impregnated sintered member.

* * * * *